INVENTOR
HENRI GARDERE
BY Adams + Bush
ATTORNEYS

May 27, 1952 H. GARDERE 2,598,159

SIGNALING ARRANGEMENT FOR TWO-WIRE TELEPHONE LINES

Filed Oct. 22, 1948 3 Sheets-Sheet 2

INVENTOR
HENRI GARDERE
By
Adams + Bush
ATTORNEYS

May 27, 1952 H. GARDERE 2,598,159

SIGNALING ARRANGEMENT FOR TWO-WIRE TELEPHONE LINES

Filed Oct. 22, 1948 3 Sheets-Sheet 3

INVENTOR
HENRI GARDERE

BY Adams & Bush
ATTORNEYS

Patented May 27, 1952 2,598,159

UNITED STATES PATENT OFFICE 2,598,159

SIGNALING ARRANGEMENT FOR TWO-WIRE TELEPHONE LINES

Henri Gardère, Paris, France, assignor to Compagnie Industrielle des Telephones, Paris, France, a corporation of France Application October 22, 1948, Serial No. 55,993
In France October 28, 1947

8 Claims. (Cl. 179—16)

Figure 1:
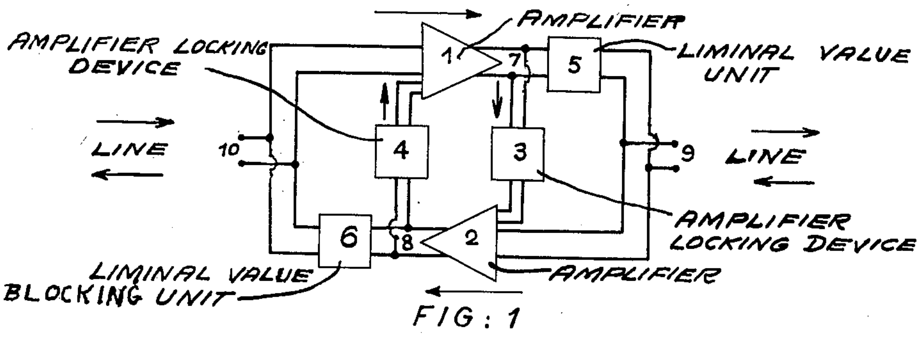

My invention relates to a low frequency signalling arrangement, allowing, in a telephone system using a two-wire transmission line, the re-transmission of ringing or signalling or dialing currents in order that these signalling currents shall by-pass a talking current repeater connected in the two-wire line.

Low-frequency signalling arrangements as heretofore known have generally comprised two symmetrical sets of electromagnetic relays which respectively provide for the relaying of the ringing current in the two transmission directions. A ringing signal arising in one direction on the incoming line, actuates the first relay of the set of relays assigned to that direction, and the last relay of this same set connects across the line, beyond the talking current repeater (in the direction in which the signal is being sent) a source of low-frequency ringing current, the frequency of which is approximately the same as that of the incoming signalling current which is to be re-transmitted.

Moreover, one of the relays of the set of relays assigned to one direction of transmission, is connected so as to open, when that relay is energized, the energization circuit of the relays of the set of relays assigned to the other transmission direction, in order to avoid a return of signalling current, or the starting of oscillations.

In my co-pending application, Ser. No. 31,084, filed June 4, 1948, now Patent No. 2,594,007, issued April 22, 1952, for Device for Re-transmission of Signals by Two Wire Telephone Lines, I have described similarly signalling arrangements wherein the sets of relays above mentioned are replaced by gas tubes such as "thyratrons."

In other known arrangements, the first relay of each of these sets is replaced by a vacuum triode.

However, in none of these devices of the prior art are the active members constituted solely by vacuum tubes, so that their manner of operation is not linear, contrary to what occurs with vacuum tubes, and this it will be appreciated, is prejudicial to the fidelity of retransmission of the signals.

The signalling arrangement to which this present invention relates, employs as active members, vacuum amplifier tubes with one or more grids, with the exclusion of any mechanical device and any device causing feedback. It ensures the transmission of the signals in both directions along a two-wire line, without initiating any oscillations or ringing or howling tones.

In the case in which the amplification necessary for the retransmission of the signals or ringing current, is not too great, the signalling arrangement according to this present invention may comprise as active members, only two tubes, one for each direction of transmission, each playing the part of a set of relays of the usual signalling devices of the prior art. It is even possible to use as active devices of the signalling arrangement, the tubes of the talking current repeater itself to which it is attached in such manner that the signalling device may be carried into effect by the addition to the repeater of purely passive devices.

The signalling arrangement in conformity with this present invention is characterized in that it comprises, for each direction of transmission, the following devices:

(1) An amplifier with one or more vacuum tubes (according to the necessary amplifications) to whose input is applied an incident signal to be re-transmitted.

(2) A locking device energized by the incident signal, and cancelling out the gain of the amplifier of the other direction as soon as the amplitude of the incident signal attains a predetermined value.

(3) A liminal value effect device placed below the locking device and attenuating or suppressing the effect of the signal at the input of the amplifier in the other direction as long as the locking of the same is not sufficient.

Figure 5:
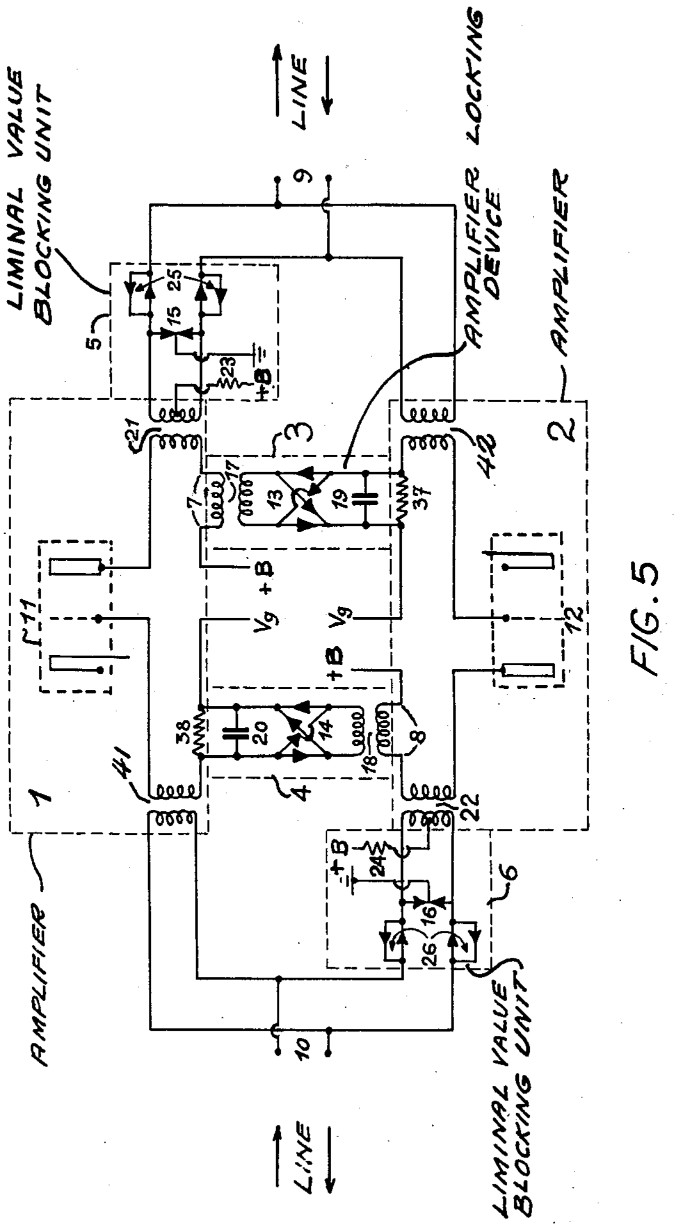
Figure 6:
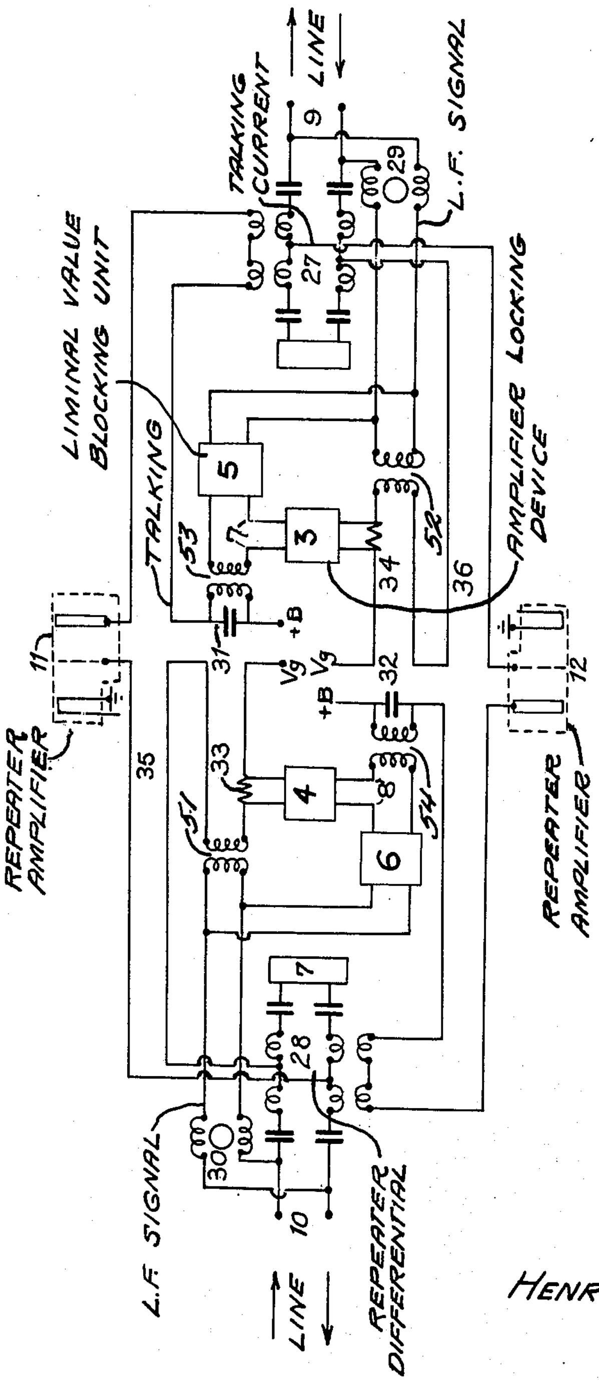

The accompanying drawings represent by way of example, various embodiments of the signalling arrangement according to this present invention. Figs. 1, 2, 3 and 4 are block diagrams showing the respective positions of the various devices in the circuit. Fig. 5 is a more detailed diagram of the circuit of Fig. 1, and Fig. 6 represents an embodiment of the signalling arrangement employing the same tubes as the talking current repeater with which it is associated.

In Fig. 1, 9 and 10 are the terminals of the two-wire line between which the signalling arrangement is connected. The talking current repeater, which is in addition to the signalling arrangement, and is not shown is likewise connected between these points. 1 designates the vacuum tube amplifier which amplifies the signals in the direction of 10 towards 9. To the output terminals 7 of this amplifier is connected the device 3 which brings about the locking of the amplifier 2 directed in the other direction. Beyond the shunt 7 is located the unit 5 with the liminal value effect.

The circuit arrangement is symmetrical for the other direction of transmission, and comprises the amplifier 2, the locking device 4 connected at 8, and the unit with the liminal value effect 6.

The locking devices 3 and 4, the task of which is to lock respectively the amplifiers 2 and 1, may be constituted in any known manner. It will be advantageously constituted by a bridge of dry rectifiers giving a negative polarization voltage on a control grid of a tube of the amplifiers.

The liminal value devices may likewise be constituted in any desired manner. An advantageous embodiment is obtained by means of a polarized network of dry rectifiers.

The manner of operation of the arrangement of Fig. 1 is as follows:

When a signal appears at 10 it is amplified by amplifier 1 and the locking system 3 tends to prevent the return of the current going in the other direction through the amplifier 2. But it is clear that if, as from the shunt 7 the amplified signals should be transmitted directly towards the terminals 9 of the line and then fed back to terminals 10, then oscillation would start. In fact, the so transmitted current would always have, at a given instant, a rather weak amplitude in order that the effect of locking due to device 3 be negligible, so that this returned current would be amplified in amplifier 2, then again in amplifier 1 and so forth; therefore there would be an initiation of oscillations the amplitude of which would moreover, be limited by the locking effect of device 3 and of device 4.

The liminal value effect arrangement 5 avoids this undesired manner of operation by preventing the signal delivered from the output of amplifier 1 from reaching the input of the other amplifier 2 as long as the locking effect of device 3 is not produced. As soon as the liminal value of the liminal unit 5 is exceeded by the signals delivered by amplifier 1, the signals are transmitted to line terminal 9, but the effect of the locking of device 3 is then sufficient to prevent any amplification of the signal by amplifier 2. I have found that it is possible to regulate the locking effect and the liminal value effect of the respective devices in such manner that the amplitude of the liminal value may be as low as desired so that the amplification of the signals may be practically linear.

The order in which the amplifier 1, the shunt 7 and the liminal value device 5 are connected, may be changed, provided that the shunt 7 remains ahead of liminal value device 5; it will be appreciated that the same applies for the devices of the other direction of transmission.

Figure 2:
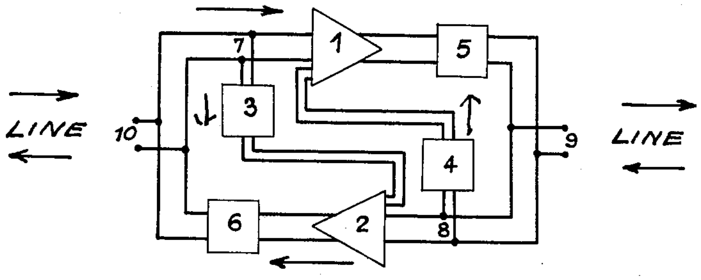
Figure 3:
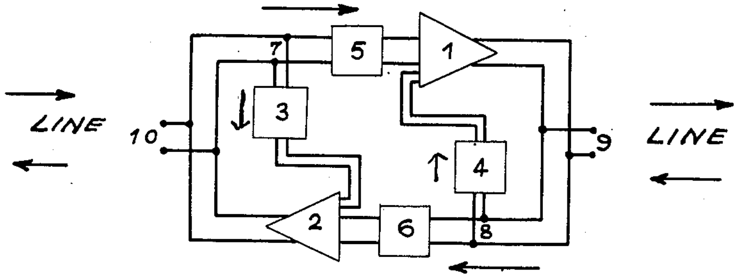

Figs. 2 and 3 represent two such modifications of the circuit of Fig. 1. Moreover the shunt, the locking device and the liminal value device corresponding to one given direction of transmission, may be arranged in the circuits of the amplifier used in that direction.

Figure 4:
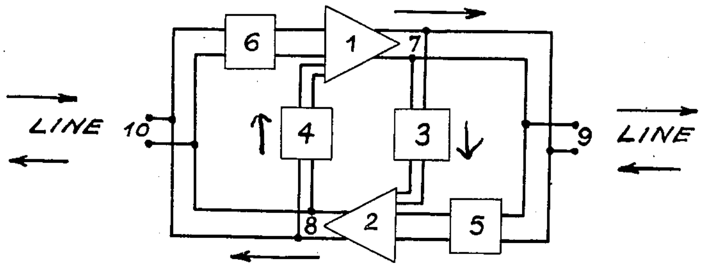

Fig. 4 shows another modification wherein the liminal value unit 5 is arranged between the line terminals 9 and the amplifier 2, the liminal value device 6 being then placed between the line terminals 10 and the amplifier 1. In such an arrangement as shown in Fig. 4, the amplifier and the liminal value arrangement may be condensed to form one single unit, the liminal value effect being obtained by negative polarization of the grids of the tubes of the amplifier of value sufficient to cancel out their plate current. Thus the transmission is blocked until the amplitude of the applied signals is sufficient to cause the plate current of the amplifier tube to appear.

This arrangement is particularly economical, but it destroys the linearity of the amplification, unless push-pull tubes be used.

Fig. 5 is a more detailed circuit given by way of example, of a circuit according to the signalling arrangement according to Fig. 1. In this Figure 5, 11 and 12 designates the tubes of the amplifiers 1 and 2 (triodes are shown in the diagram but it will be appreciated that it is possible to use other tubes such as tetrodes, pentodes and so forth). The heating circuit of these tubes has not been shown. The plates are energized with a voltage $V_p$, and the plate current corresponding to the normal rating is obtained when the grids are brought, in relation to the cathodes, to a determined voltage $V_g$. The locking devices 3 and 4 are arranged in series in the plate circuits of the amplifier tubes 11 and 12. The locking of the amplifier 2 by the delivered signals amplified by amplifier 1 is effected in the following manner:

The incoming signalling current from line terminals 10 after amplification by the tube 11 passes through the transformer 17 to locking device 3 and is rectified by the bridge of rectifiers 13, and the rectified current produces across the terminals of the resistance 37 in the grid circuit of the tube 12 a negative direct bias voltage which is smoothed out by the condenser 19. This bias voltage reduces or cancels out the plate current of the tube 12 thus opposing the transmission through the amplifier 2. In the same manner the amplifier 1 is locked by the current delivering from amplifier 2, passing through the transformer 18 and the rectifier bridge 14 and applying a negative voltage at the terminals of the resistance 38.

The liminal value devices 5 and 6 which are constituted by the networks of dry rectifiers 15—25 and 16—26, function in the following manner which will be described for the direction 10—9, the manner of operation in the opposite direction 9—10 being analogous:

Two rectifiers 15 connected in series and in opposed direction, are arranged in shunt across the output circuit of the amplifier tube 11, they are polarized symmetrically by the plate voltage $V_p$ through the resistance 23, the two halves of the secondary of the transformer 21, and earth. As long as the current induced in the secondary of transformer 21 by the anode current of the tube 11 does not exceed the polarization current of the rectifiers 15 the latter behave like a short-circuit; on the contrary, when the anode current delivered from the tube exceeds the polarization current they behave like a high resistance. Thus the secondary circuit of transformer 21 is short-circuited as long as the signalling current is lower than the determined polarization current.

This liminal effect is increased by the action of the auxiliary rectifiers 25. These are arranged in two groups constituted each by two rectifiers arranged in opposite direction and connected in parallel, each group being placed in series in one of the wires of the output circuit of the amplifier. Now, it is known that two rectifiers connected in parallel and in opposite direction behave like a high resistance for voltages lower than a certain limit characteristic of the rectifiers, and like a low resistance or one which is even negligible, for voltages higher than this limit. Therefore the rectifiers may be selected in such manner that when the signal voltage amplitudes are lower than the liminal value desired, the rectifiers 15 behave like a short-circuit and the rectifiers 25 like a cut-out or open circuit. When the liminal value is exceeded the short circuit 15 and the cut-out 25, disappear and the amplified signals delivered by tube 11 pass freely towards line terminal 9.

Moreover, the cut-out effect of the rectifiers 25 for low voltages has the result of preventing the effect of short-circuit of the rectifiers 15 upon the currents coming from line terminal 9 for the transmission direction 9—10.

The liminal value system 6 for this latter direction of transmission from terminal 9 to terminal 10 is identical with the liminal system 5 and comprises the rectifiers 16 and 26, the transformer with mid-point 22 and the resistance 24.

Fig. 6 represents an example of the signalling arrangement according to this present invention, associated with a talking current repeater and employing the same tubes as this repeater employs. The previously described devices carry the same reference numerals as in the preceding Figures 1–5. Only the characteristics of connection of the talking current repeater and of the signalling arrangement are hereinafter described.

At the line terminals 10 are connected in parallel the inputs of the talking current repeater and of the signalling arrangement for the direction 10–9. The blocking condensers of the differential system 28 of the repeater have a large impedance for the low-frequency signalling currents so that the latter are without action on the repeater circuits for talking currents. At the input of the signalling arrangement is placed in series, an inductance 30 the impedance of which is high for the telephone talking currents and negligible for the low-frequency signalling currents, so that the shunt of the signalling device is without effect on the telephone talking currents. The telephone talking voltage and the signalling voltage are applied in series in the grid circuit of the tube 11 through the circuits 35 and 33. These two voltages cannot interfere by reason of the infinite impedance of the grid circuit. In the output plate circuit of the tube 11 the circuits of the talking current repeater and of the signalling current arrangement are likewise in series. Careful filtering prevents them from influencing each other. This filtering is due to the low impedance presented by the transformer of the differential system 27 for the low-frequency signal currents, and to the low impedance presented by the condenser 31 (shunting the circuit of the signalling device) for the telephone talking currents. The connections of the circuits of the talking current repeater and of the signalling arrangement for the opposite direction 9–10 are symmetrical with those corresponding to the direction 10—9, and will not be described.

It is evident that the described arrangement of Fig. 6 cannot work in entirely satisfactory manner as far as the filtering is concerned—that is, the suppression of the mutual influence of the talking current repeater, and of the signalling arrangement, owing to the wide difference of frequency usually provided between the telephone talking currents and the signalling currents. In the case in which it should be desired to produce a system with a reduced difference between these frequencies, it would be necessary to connect true directing filters between the various circuits.

The signalling arrangement to which this present invention relates offers the advantage of only using as active members, vacuum amplifier tubes such as triode, pentode and so on, the perfect fidelity of which is known, to the exclusion of any electromechanical device or gas discharge tube. The retransmission of the signals may therefore be practically linear. This advantage is particularly important in the case in which it is desired to transmit rapid and relatively complex signals as dialing currents, for example signals at 50 cycles per second in trains of 66 milleseconds and with intervals of 32 milliseconds, employed in the practice of automatic telephony.

The use for the signalling arrangement of the tubes of the repeater with which it is associated, allows of especially advantageous embodiments having relatively small overall dimensions.

Having now particularly described and ascertained the nature of my said invention and in what manner the same is to be performed, I declare that what I claim is:

1. In a two-way repeater for telephone lines, a first pair of line terminals, a second pair of line terminals, a first channel for transmitting signals from said first terminals to said second terminals, a second channel for transmitting signals from said second terminals to said first terminals, a first tube amplifier comprised in said first channel and having its input connected therein in the direction of said first terminals, a second tube amplifier comprised in said second channel and having its input connected therein in the direction of said second terminals, a first locking rectifier unit having its input connected to said first channel and having its output connected and poled to apply negative bias to the grid of said second tube amplifier when signal output is applied to said first terminals, a second locking rectifier unit having its input connected to said second channel and having its output connected and poled to apply negative bias to the grid of said first tube amplifier when signal output is applied to said second terminals, a first liminal control short-circuiting device inserted in a said channel in the path of current from said first terminals to the input of said second amplifier at a point of said path which is beyond the point of connecting the input of said first locking device to said first channel on the side toward said second line terminals, said first liminal control device being so constructed that under an applied input signal thereto below a determined liminal value but not above that liminal value said first liminal control device constitutes substantially a short circuit across the said channel, and a second liminal control device constructed similarly to said first liminal control device and being inserted in a said channel in the path of current from said second terminals to the input of said first amplifier at a point of said path which is beyond the point of connecting the input of said second locking device to said second channel on the side toward said first line terminals.

2. In a two-way repeater for telephone lines, a first pair of line terminals, a second pair of line terminals, a first channel for transmitting signals from said first terminals to said second terminals, a second channel for transmitting signals from said second terminals to said first terminals, a first tube amplifier comprised in said first channel and having its input connected to said first terminals, a first liminal control short-circuiting device connected between the output of said first amplifier and said second terminals and being so constructed that under an applied output signal from said first amplifier below a determined liminal value but not above that liminal value it constitutes substantially a short circuit across the output of said first amplifier, a second tube amplifier comprised in said second channel and having its input connected to said second terminals, a second liminal control device constructed similarly to said first liminal control device and connected between the output of said second amplifier and said first terminals, a first locking rectifier unit having its input connected to said first channel at a point between the output of said first amplifier and said first liminal control device and having its output connected and poled to apply negative bias to the grid of said second tube amplifier when signal output is delivered by said first amplifier, and a second locking rectifier unit having its input connected to said second channel at a point between the output of said second amplifier and said second liminal control device and having its output connected and poled to apply negative bias to the grid of said first tube amplifier when signal output is delivered by said second amplifier.

3. In a two-way repeater for telephone lines, a first pair of line terminals, a second pair of line terminals, a first channel for transmitting signals from said first terminals to said second terminals, a second channel for transmitting signals from said second terminals to said first terminals, a first tube amplifier comprised in said first channel and having its input connected therein in the direction of said first terminals, a second tube amplifier comprised in said second channel and having its input connected therein in the direction of said second terminals, a first locking rectifier unit having its input connected to said first channel at a point thereof on the output side of said first amplifier, and having its output connected and poled to apply negative bias to the grid of said second tube amplifier when signal output is delivered by said first amplifier, a second locking rectifier unit having its input connected to said second channel at a point thereof on the output side of said second amplifier and having its output connected and poled to apply negative bias to the grid of said first tube amplifier when signal output is delivered by said second amplifier, a first liminal control short-circuiting device connected between said second terminals and the input of said second amplifier and being so constructed that under an applied input signal thereto below a determined liminal value but not above that liminal value said first liminal control device constitutes substantially a short circuit across said second channel, and a second liminal control device constructed similarly to said first liminal control device connected between said first terminals and the input of said first amplifier.

4. A repeater according to claim 2, each said liminal control device comprising a pair of opposing principal rectifier elements connected in series across its said channel and a source of biasing voltage connected to the common point of said principal rectifier elements, and further comprising two pairs of auxiliary rectifier elements connected in parallel and each pair of said auxiliary rectifier elements being respectively inserted in series in the respective sides of its channel, said elements of each said pair of said auxiliary rectifier elements being oppositely poled.

5. In a two-way repeater for telephone lines, a first pair of line terminals, a second pair of line terminals, first and second selective filtering input means connected to each said pair of terminals and adapted to separate talking currents applied to said pair of terminals from signaling currents applied thereto, and having input connections and signaling output connections and talking output connections, a first signaling channel for transmitting signal currents from the signaling output connections of said first input means to said second pair of terminals, a second channel for transmitting signal currents from the signaling output connections of said second input means to said first pair of terminals, a first tube amplifier having connected in series in its input circuit the signaling output connections and the talking output connections of said first input means, first output selecting means comprising said second input means connected in series in the output circuit of said first amplifier and connected to said first signaling channel and adapted to deliver amplified talking output current and amplified signaling current from the output of said first amplifier to said second pair of terminals, a second tube amplifier having connected in series in its input circuit the signaling output connections and the talking output connections of said second input means, the output circuits of said two amplifiers respectively being comprised in said first and second signaling channels, second output selective means comprising said first input means connected in series in the output circuit of said second amplifier and connected to said second signaling channel and adapted to deliver amplified talking current and amplified signaling current from the output of said second amplifier to said first pair of terminals, a first locking rectifier unit having its input connected to the output circuit of said first amplifier and having its output connected and poled to apply negative bias to the grid of said second amplifier when signal output is delivered by said first amplifier, a second locking rectifier unit having its input connected to the output circuit of said second amplifier and having its output connected and poled to apply negative bias to the grid of said first amplifier when signal output is delivered by said second amplifier, a first liminal control short-circuiting device inserted in said first signaling channel between said second pair of terminals and the point where the input connections of said first locking rectifier unit are connected to the output circuit of said first amplifier, and being so constructed that under an applied input signal applied from said first amplifier below a determined liminal value but not above that liminal value the said first laminal control unit constitutes substantially a short circuit across said first signaling channel, and a second liminal control short-circuiting device constructed similarly to said first liminal control device and inserted in said second signaling channel between said first pair of terminals and the point where the input connections of said second locking rectifier unit are connected to the output circuit of said second amplifier.

6. A repeater according to claim 5, each said liminal device comprising a pair of opposing principal rectifier elements connected in series across its said channel and a source of biasing voltage connected to the common point of said principal rectifier elements, and further comprising two pairs of auxiliary rectifier elements connected in parallel and each pair of said auxiliary rectifier elements being respectively inserted in series in the respective sides of its channel, said elements of each said pair of said auxiliary rectifier elements being oppositely poled.

7. In a two-way repeater for telephone lines, a first pair of line terminals, a second pair of line terminals, a first channel for transmitting signals from said first terminals to said second terminals, a second channel for transmitting signals from said second terminals to said first terminals, a first tube amplifier comprised in said first channel and having its input connected to said first terminals, a first liminal control short-circuiting device connected between the output of said first amplifier and said second terminals and being so constructed that under an applied output signal from said first amplifier below a determined liminal value it constitutes substantially a short circuit across the output of said first amplifier and also constitutes a high resistance in series between said output of said first amplifier and said second terminals, and under an applied output signal from said first amplifier above said determined liminal value it constitutes a shunt of high resistance across the output of said first amplifier and a resistance of negligible value in series between said output of said first amplifier and said second terminals, a second tube amplifier comprised in said second channel and having its input connected to said second terminals, a second liminal control device constructed similarly to said first liminal control device and connected between the output of said second amplifier and said first terminals, a first locking rectifier unit having its input connected to said first channel at a point between the output of said first amplifier and said first liminal control device and having its output connected and poled to apply negative bias to the grid of said second tube amplifier when signal output is delivered by said first amplifier, and a second locking rectifier unit having its input connected to said second channel at a point between the output of said second amplifier and said second liminal control device and having its output connected and poled to apply negative bias to the grid of said first amplifier when signal output is delivered by said second amplifier.

8. A repeater according to claim 7, each said liminal control device comprising a pair of opposing principal rectifier elements connected in series across its said channel and a source of biasing voltage connected to the common point of said principal rectifier elements, and further comprising two pairs of auxiliary rectifier elements connected in parallel and each pair of said auxiliary rectifier elements being respectively inserted in series in the respective sides of its channel, said elements of each said pair of said auxiliary rectifier elements being oppositely poled.

HENRI GARDÈRE.

REFERENCES CITED

The following references are of record in the file of this patent:

UNITED STATES PATENTS

| Number | Name | Date |
|---|---|---|
| 1,795,295 | Dahms | Mar. 10, 1931 |
| 1,811,947 | Legg | June 30, 1931 |
| 1,811,963 | Peterson | June 30, 1931 |
| 1,866,592 | Bjornson | July 12, 1932 |
| 2,018,464 | Nebel | Oct. 22, 1935 |
| 2,019,577 | Mitchell et al. | Nov. 5, 1935 |
| 2,422,309 | McCreary | June 17, 1947 |

FOREIGN PATENTS

| Number | Country | Date |
|---|---|---|
| 287,651 | Italy | July 31, 1931 |
| 643,015 | Germany | Mar. 31, 1937 |